US012326822B2

(12) United States Patent
Li et al.

(10) Patent No.: US 12,326,822 B2
(45) Date of Patent: Jun. 10, 2025

(54) DATA PROCESSING METHOD AND APPARATUS

(71) Applicant: Hangzhou AliCloud Feitian Information Technology Co., Ltd., Hangzhou (CN)

(72) Inventors: Xuhui Li, Chengdu (CN); Zhongjie Wu, Chaoyang District (CN)

(73) Assignee: Hangzhou AliCloud Feitian Information Technology Co., Ltd., Hangzhou (CN)

( * ) Notice: Subject to any disclaimer, the term of this patent is extended or adjusted under 35 U.S.C. 154(b) by 25 days.

(21) Appl. No.: 18/292,850

(22) PCT Filed: Jul. 19, 2022

(86) PCT No.: PCT/CN2022/106558
§ 371 (c)(1),
(2) Date: Jan. 26, 2024

(87) PCT Pub. No.: WO2023/005748
PCT Pub. Date: Feb. 2, 2023

(65) Prior Publication Data
US 2024/0330211 A1  Oct. 3, 2024

(30) Foreign Application Priority Data
Jul. 27, 2021 (CN) .......................... 202110850461.8

(51) Int. Cl.
*G06F 13/12* (2006.01)
(52) U.S. Cl.
CPC .......... *G06F 13/126* (2013.01); *G06F 13/128* (2013.01)
(58) Field of Classification Search
CPC ...... G06F 13/126; G06F 13/128; G06F 3/061; G06F 3/0638
See application file for complete search history.

(56) References Cited

U.S. PATENT DOCUMENTS 11,171,936 B2 *  11/2021  Zhang ..................... G06F 21/10
11,550,479 B1 *  1/2023   Shatsky ................ G06F 3/0613
(Continued)

FOREIGN PATENT DOCUMENTS

CN      102387219 A    3/2012
CN      102497322 A    6/2012
(Continued)

OTHER PUBLICATIONS

Mandal et al, "Storage Offload on SmartNICs", Sep. 2019, Intel (Year: 2019)*

(Continued)

*Primary Examiner* — Phong H Dang
(74) *Attorney, Agent, or Firm* — Maschoff Brennan

(57) ABSTRACT

A data processing method, applied to a server including a network interface card, a central processing unit and a storage medium. The network interface card performs traffic distribution processing on initial data, determines control data, index data and service data of the initial data, and stores the control data and the index data in the central processing unit. The central processing unit parses the control data, determines a data execution operator corresponding to the control data, issues the data execution operator to the network interface card, processes the index data of the initial data, and stores the processed index data in the medium. The network interface card performs calculation on the service data based on the data execution operator, and stores, in the medium, target service data, index data of the target service data, and metadata of the target service data and the index data determined through the calculation.

20 Claims, 7 Drawing Sheets

(56) References Cited

U.S. PATENT DOCUMENTS

| | | | |
|---|---|---|---|
| 2002/0062333 A1* | 5/2002 | Anand | H04L 69/324 |
| | | | 718/105 |
| 2010/0205381 A1 | 8/2010 | Canion | |
| 2016/0277245 A1 | 9/2016 | Wei | |
| 2023/0105067 A1* | 4/2023 | Wang | G06F 3/067 |
| | | | 711/154 |
| 2023/0342399 A1* | 10/2023 | Luo | G06F 9/5038 |
| 2024/0004828 A1* | 1/2024 | Tanaka | G06F 15/17306 |
| 2024/0004877 A1* | 1/2024 | Shatsky | G06F 16/245 |
| 2024/0201880 A1* | 6/2024 | Jiang | G06F 12/121 |

FOREIGN PATENT DOCUMENTS

| | | |
|---|---|---|
| CN | 107273213 A | 10/2017 |
| CN | 111162935 A | 5/2020 |
| CN | 112073327 A | 12/2020 |
| CN | 112181125 A | 1/2021 |
| CN | 113037624 A | 6/2021 |
| CN | 113296718 A | 8/2021 |

OTHER PUBLICATIONS

Notice of Allowance dated Oct. 8, 2021 for CN Patent Application No. 202110850461.8.
The first Office Action dated Aug. 31, 2021 for CN Patent Application No. 202110850461.8.
International Search Report and Written Opinion of the International Search Authority for the International Patent Application No. PCT/CN2022/106558, mailed Aug. 30, 2022.

* cited by examiner

DATA PROCESSING METHOD AND APPARATUS

CROSS REFERENCE TO RELATED APPLICATIONS

This application is a National Stage of International Application No. PCT/CN2022/106558, filed on Jul. 19, 2022, which claims priority to Chinese patent application No. 202110850461.8, entitled "Data Processing Method and Apparatus" and filed to the China National Intellectual Property Administration on Jul. 27, 2021, all of which are incorporated herein by reference in their entirety.

TECHNICAL FIELD

Embodiments of the present application relate to the field of computer technology and, in particular, to a data processing method. One or more embodiments of the present application also relate to a data processing apparatus, a computing device, and a computer-readable storage medium.

BACKGROUND

In the era of big data, information data volume has increased explosively. Storage systems under traditional architectures have been unable to meet the needs of information systems in different industries in terms of compatibility, unified management, scalability, security, and differentiated services. Due to the fact that general-purpose servers, which are widely used in the field of software-defined storage (SDS), do not take into account the special needs of storage IO (input and output) processing, the bottleneck of the overall performance of the storage system is gradually shifting from traditional hard disks to CPU and network as the performance of semiconductor storage becomes higher and higher. The performance bottleneck of the CPU is becoming more and more prominent. More complex calculation operations affect the processing speed of the CPU, which in turn reduces the performance of the entire storage system and affects the storage efficiency of users.

SUMMARY

In view of this, an embodiment of the present application provides a data processing method. One or more embodiments of the present application also relate to a data processing apparatus, a computing device, and a computer-readable storage medium to solve technical deficiencies existing in the prior art.

According to a first aspect of embodiments of the present application, there is provided a data processing method, applied to a server which includes a network interface card, a central processing unit and a storage medium, where the method includes:

performing, by the network interface card, traffic distribution processing on received initial data, determining control data, index data and service data of the initial data, and storing the control data and the index data in the central processing unit;

parsing, by the central processing unit, the control data, determining a data execution operator corresponding to the control data, issuing the data execution operator to the network interface card, processing the index data of the initial data, and storing the processed index data in the storage medium;

performing, by the network interface card, calculation on the service data based on the data execution operator, and storing, in the storage medium, target service data, index data of the target service data, and metadata of the target service data and the index data which are determined through the calculation.

According to a second aspect of the embodiments of the present application, there is provided a data processing apparatus, applied to a server which includes a network interface card, a central processing unit and a storage medium, where the network interface card is configured to perform traffic distribution processing on received initial data, determine control data, index data and service data of the initial data, and store the control data and the index data in the central processing unit;

the central processing unit is configured to parse the control data, determine a data execution operator corresponding to the control data, issue the data execution operator to the network interface card, process the index data of the initial data, and store the processed index data in the storage medium;

the network interface card is further configured to perform calculation on the service data based on the data execution operator, and store, in the storage medium, target service data, index data of the target service data, and metadata of the target service data and the index data which are determined through the calculation.

According to a third aspect of the embodiments of the present application, there is provided a data processing system, including: a network interface card, a central processing unit, and a storage medium, where the network interface card is configured to perform traffic distribution processing on received initial data, determine control data, index data and service data of the initial data, and store the control data and the index data in the central processing unit;

the central processing unit is configured to parse the control data, determine a data execution operator corresponding to the control data, issue the data execution operator to the network interface card, process the index data of the initial data, and store the processed index data in the storage medium;

the network interface card is further configured to perform calculation on the service data based on the data execution operator, and store, in the storage medium, target service data, index data of the target service data, and metadata of the target service data and the index data which are determined through the calculation.

According to a fourth aspect of the embodiments of the present application, there is provided a computing device, including:

a memory and a processor;

where the memory is configured to store a computer-executable instruction, and the processor is configured to execute the computer-executable instruction, and when the computer-executable instruction is executed by the processor, steps of the data processing method are implemented.

According to a fifth aspect of the embodiments of the present application, there is provided a computer-readable storage medium which stores a computer-executable instruction, where when the computer-executable instruction is executed by the processor, steps of the above data processing method are implemented.

According to a sixth aspect of the embodiments of the present application, there is provided a computer program which, when executed in a computer, the computer is caused to perform steps of the above data processing method.

In an embodiment of the present application, the network interface card performs traffic distribution processing on the received initial data, determines the control data, the index data and the service data of the initial data, and stores the control data and the index data in the central processing unit; the central processing unit parses the control data, determines the data execution operator corresponding to the control data, issues the data execution operator to the network interface card, and processes the index data of the initial data and stores the processed index data in a storage medium; the network interface card performs calculation on the service data based on the data execution operator, and stores, in the storage medium, the target service data, the index data of the target service data, and the metadata of the target service data and the index data which are determined through the calculation.

Specifically, traffic distribution processing is performed on the initial data through the network interface card, and the control data and the index data are stored in the central processing unit. The central processing unit determines the execution operator for the service data of the initial data based on the control data, and issues the execution operator to the network interface card, and then the network interface card performs calculation processing on the service data of the initial data, and stores the processed service data directly from the network interface card to the storage medium. Through the above method, there is no need to occupy the processing resources of the central processing unit, and the computing operation performed by the central processing unit is transferred to the network interface card for execution, which greatly reduces the computing work of the central processing unit to realize the process of data storage acceleration, improve the storage performance of the system, and enhance the user's storage efficiency.

DESCRIPTION OF EMBODIMENTS

Figure 1:
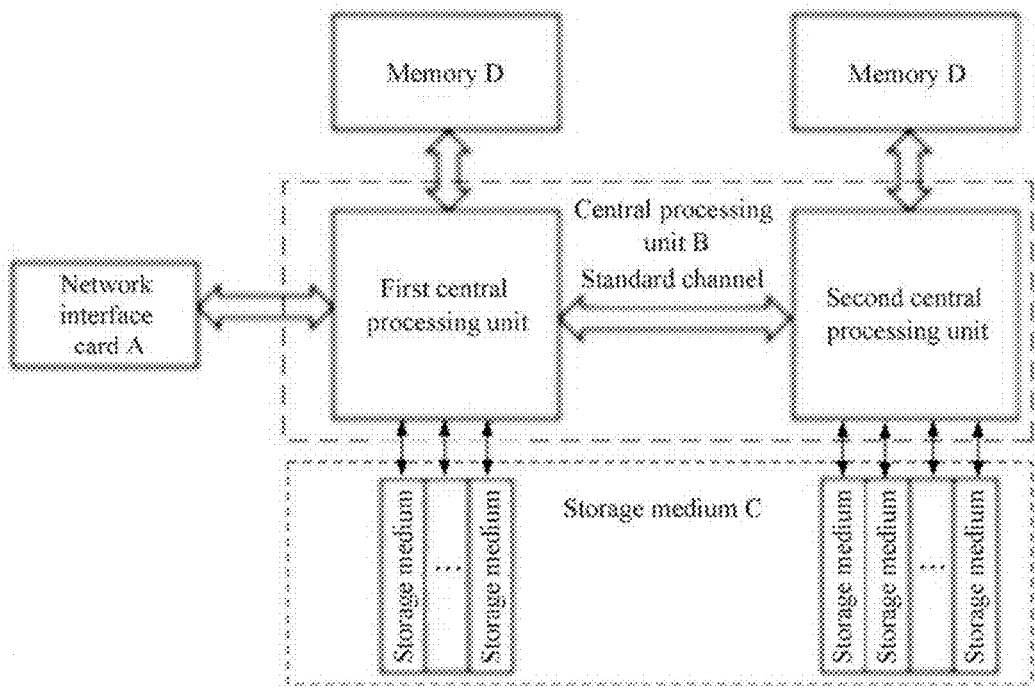
FIG. 1 is a schematic diagram of a system storage structure of a data processing method provided by an embodiment of the present application.

In the following description, numerous specific details are set forth in order to provide a thorough understanding of the present application. However, the present application can be implemented in many other ways different from those described herein. Those skilled in the art can make similar extensions without violating the connotation of the present application. Therefore, the present application is not limited by the specific implementations disclosed below.

The terminology used in one or more embodiments of the present application is for the purpose of describing particular embodiments only and is not intended to limit the one or more embodiments of the present application. As used in one or more embodiments of the present application and the appended claims, the singular forms "a", "an" and "the" are intended to include the plural forms as well, unless the context clearly dictates other meanings. It will also be understood that the term "and/or" as used in one or more embodiments of the present application refers to and encompasses any and all possible combinations of one or more of the associated listed items.

It should be understood that although the terms "first", "second", etc. may be used to describe various information in one or more embodiments of the present application, the information should not be limited to these terms. These terms are only used to distinguish information of the same type from each other. For example, without departing from the scope of one or more embodiments of the present application, the "first" may also be called the "second", and similarly the "second" may also be called the "first". Depending on the context, the word "if" as used herein may be interpreted as "at a time when" or "when" or "in response to determining".

First, the terminologies involved in one or more embodiments of the present application are explained.

SDS (Software Defined Storage): storage management software that separates storage hardware in a form of storage virtualization.

SmartNIC (Smart Network Interface Card): using FPGA to assist the CPU (Central Processing Unit) to process network loads and program network interface functions.

SCM: Storage Class Memory, persistent memory.

NVMe (Non Volatile Memory Host Controller Interface Specification, NVMHCIS): a storage interface protocol, usually defined based on PCIe.

GC: garbage collect.

EC (Errasure Code): a data redundancy algorithm, usually used to improve the reliability of distributed storage data.

Accelerator: hardware accelerator, usually implemented by FPGA or ASIC (Application Specific Integrated Circuit) hardware.

AHB (Advanced High performance Bus): an ARM (Advanced RISC Machine, Advanced Reduced Instruction Set Machine) CPU interconnect bus, where RISC is a reduced instruction set computer.

Meta data (metadata): used to describe the organization and the control data of data, i.e., describe data of data. Only with metadata can the attribute relationship of the data be identified.

Index data: data that describes the internal organization and the distribution relationship of data.

Host CPU: usually refers to a main central processing unit of a system, in this embodiment it refers to the X86 CPU.

FPGA (Field Programmable Gate Array): a large-scale gate circuit programmable device.

PCI-Express (peripheral component interconnect express): a high-speed serial computer expansion bus standard. The PCIe belongs to a high-speed serial point-to-point dual-channel high-bandwidth transmission. The connected device is allocated with exclusive channel bandwidth and without sharing of bus bandwidth. The PCIe mainly supports active power management, error reporting, end-to-end reliable transmission.

Solid State Drive (SSD), referred to as hard drive: hard drive made of solid-state electronic storage chip arrays, consisting of the control unit and the storage unit (FLASH chip, DRAM chip).

General-purpose servers are widely used in the field of software-defined storage (SDS). Since the general-purpose servers do not consider the special needs of storage IO processing, the overall storage system is not specifically optimized. In order to solve and improve the performance of flash memory systems, storage IO offloading and acceleration approaches need to be continuously explored. Based on this, the data processing method provided by the embodiment of the present application will consider the separation of the data link and the control link, and offloading the IO processing to the SmartNIC (smart network interface card) or ways such as the SmartNIC connecting with the SSD through the PCIe, so as to solve the problems of slow CPU processing speed and low storage system performance.

Software-defined storage is usually implemented by a general-purpose server, and the main components can be seen in FIG. 1. FIG. 1 shows a schematic diagram of a system storage structure of a data processing method provided by an embodiment of the present application.

In FIG. 1, part A is a network interface card, part B is a central processing unit, part C is a storage medium, and part D is a memory. Where the central processing unit is divided into a first central processing unit and a second central processing unit. Each central processing unit has a corresponding storage medium and a corresponding memory. It should be noted that the first central processing unit and the second central processing unit are connected through a QPI (Quick Path Interconnect) standard channel. In an actual application, the network interface card and the central processing unit are connected through a PCIe bus, and the central processing unit and the storage medium are also connected through a PCIe bus.

In a specific implementation, a data processing system provided by an embodiment of the present application includes: a network interface card, a central processing unit, and a storage medium. The network interface card is configured to perform traffic distribution processing on received initial data, determine control data, index data and service data of the initial data, and store the control data and the index data in the central processing unit; the central processing unit is configured to parse the control data, determine a data execution operator corresponding to the control data, issue the data execution operator to the network interface card, process the index data of the initial data, and store the processed index data in the storage medium; and the network interface card is further configured to perform calculation on the service data based on the data execution operator, and store, in the storage medium, target service data, index data of the target service data, and metadata of the target service data and the index data which are determined through the calculation.

In an actual application, a central processing unit usually has a single central processing unit or dual central processing units, to run storage system software and perform IO processing and computing tasks. With the rapid advancement of semiconductor media performance, the number and processing speed of CPUs often determine system performance, i.e., being one of the main bottleneck points. For the memory, usually there are multiple memory sticks mounted, to cache data read or written by users, as well as descriptions related to control operation and indexing of data operations, original data, etc., or to cache process data of data calculation. With the rapid improvement of media and network bandwidth, the memory channel bandwidth is no longer sufficient for use. The network interface card, usually an Ethernet interface card with dual ports, is used for external data access by the storage server. Due to RDMA (Remote Direct Memory Access) high-performance applications, data movement and placement caused by network traffic have become a focus, which requires a large amount of PCIe buses and memory channel bandwidth. As for the storage medium, usually an NVMe SSD is directly connected through a PCIe interface and is no longer transferred and connected through the HBA (Host Bus Adapter. Data reading/writing/GC recycling of the SSD consumes a large amount of the PCIe buses and the memory channel bandwidth.

Based on the above schematic diagram of the system storage structure, an IO processing path for a software-defined storage node in a data processing method provided by an embodiment of the present application can have two modes. In a first storage mode, pure CPU software processing is adopted for the IO storage path, and see FIG. 2, which shows a schematic structural diagram of a storage process of an IO stream for SDS pure software (no offloading) in a data processing method provided by an embodiment of the present application.

Figure 2:
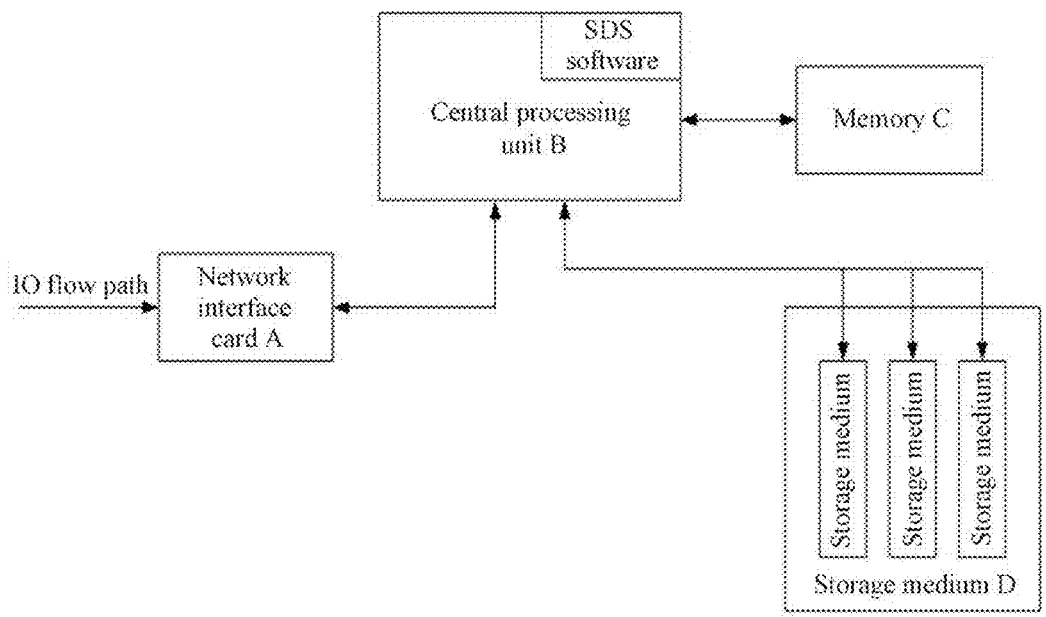
FIG. 2 is a schematic structural diagram of a storage process of an IO stream for SDS pure software (no offloading) in a data processing method provided by an embodiment of the present application.

In FIG. 2, part A is a network interface card, part B is a central processing unit, part C is a memory, and part D is a storage medium. In an actual application, first, the network interface card A sends received data to the memory C via the central processing unit B through an IO stream path, including a user reading or writing data from/to a control flow path, where the data is a mixture of service data and control data; then, the central processing unit B runs an SDS software to process the above data stored in the memory C, extracts a control flow and a data flow, processes and reorganizes the control flow and data index, and the SDS software instructs a core of the central processing unit (including using a CPU AVX (Advanced Vector Extension) instruction) to perform CRC (Cyclic Redundancy Check) calculation, EC calculation, compression and decompression calculation on the data, so that the data meets the reliability and storage space efficiency requirements required by the item storage. The control flow and the index data obtained after reorganization and the new service data obtained after calculation by the central processing unit B, will be written to the memory C; finally, the SDS software in the central processing unit B instructs the central processing unit to operate the storage medium D and write the data in the memory C to the storage medium for persistent storage, and the storage process ends.

In the process of system storage through the above method, there is no offloading from the IO path. The entire process relies on the core of the central processing unit for processing. Especially, the EC, CRC, compression and decompression calculations on data require a higher-performance central processing unit to execute, but the processing cost is higher. Moreover, the control flow and the data flow are mixed, memory operations are frequent, the memory channel becomes a bottleneck, and the bandwidth speed is not high.

Further, in a second storage mode, a dedicated storage accelerator is mounted on the central processing unit or a storage accelerator function is newly added to an existing network interface card. See FIG. 3 which shows a schematic structural diagram of a storage process of an IO stream for a central processing unit with an accelerator mounted thereon in a data processing method provided by an embodiment of the present application.

Figure 3:
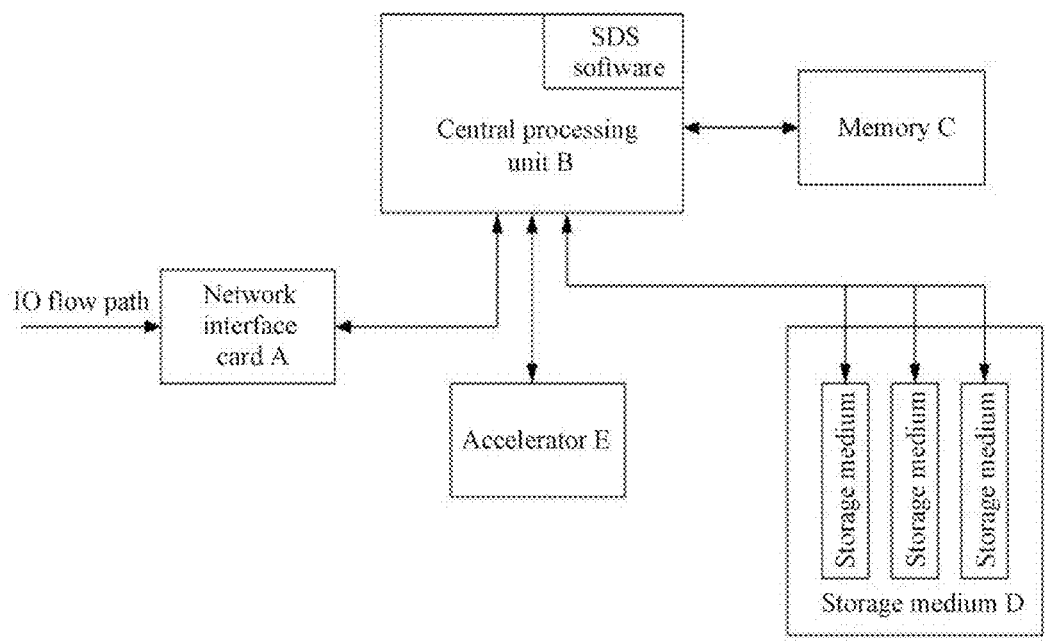
FIG. 3 is a schematic structural diagram of a storage process of an IO stream for a central processing unit with an accelerator mounted thereon in a data processing method provided by an embodiment of the present application.

In FIG. 3, part A is a network interface card, part B is a central processing unit, part C is a memory, part D is a storage medium, and part E is an accelerator. In an actual application, first, the network interface card A sends received data to the memory C via the central processing unit B through an IO flow path, including a user reading or writing data from/to the control flow path, where the data is a mixture of service data and control data; then, the central processing unit B uses SDS software to process the data in the process. The calculation process is split to the accelerator E for execution. After the splitting, the central processing unit B only needs to perform processing on the control flow and the data index. After the accelerator E completes the calculation, writing back to the memory C is required; finally, the SDS software in the central processing unit B instructs the central processing unit to operate the storage medium D and write the data in the memory C to the storage medium for persistent storage, and the storage process ends.

Figure 4:
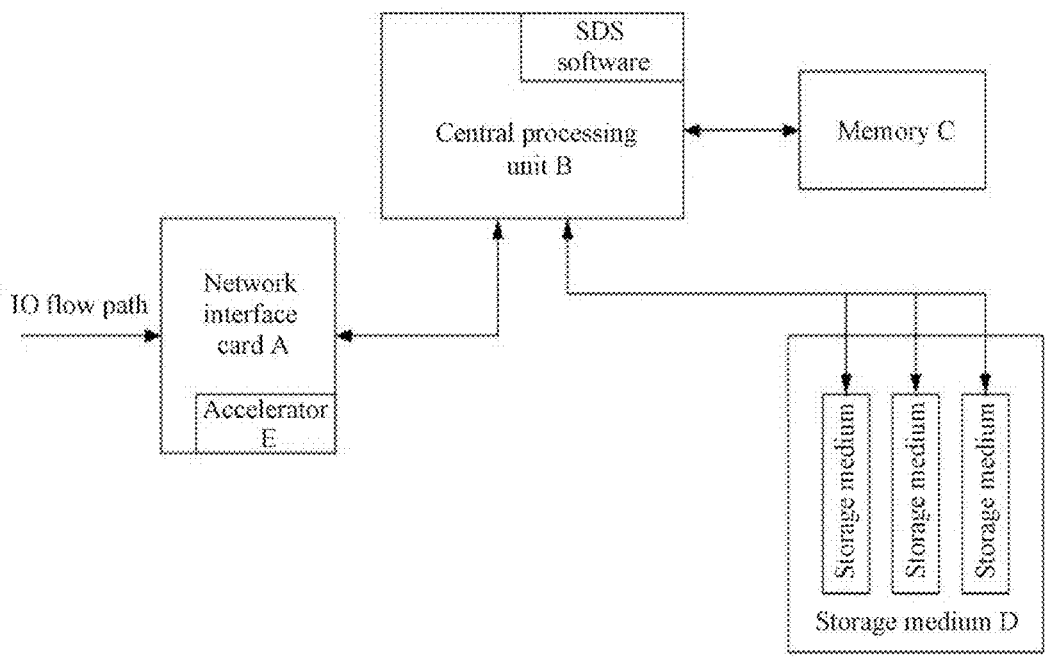
FIG. 4 is a schematic structural diagram of a storage process of an IO stream for an existing network interface card with a new storage accelerator newly added thereon in a data processing method provided by an embodiment of the present application.

See FIG. 4, which shows a schematic structural diagram of a storage process of an IO stream for an existing network interface card with a new storage accelerator newly added thereon in a data processing method provided by an embodiment of the present application.

In FIG. 4, part A is a network interface card, part B is a central processing unit, part C is a memory, and part D is a storage medium. There is an accelerator E in the network interface card A. In an actual application, first, the network interface card A sends received data to the memory C via the central processing unit B through an IO flow path, including a user reading or writing data from/to the control flow path, where the data is a mixture of service data and control data; then, the control flow is obtained from the memory C, and the data calculation process is executed on the accelerator E in the network interface card A. After the accelerator E in the network interface card A completes the calculation, writing back to the memory C is required; finally, the SDS software in the central processing unit B instructs the central processing unit to operate the storage medium D and write the data in the memory C to the storage medium for persistent storage, and the storage process ends.

In the process of system storage through the above method, data calculation by the accelerator needs the central processing unit to actively participate in and control, which increases the number of interactions between the central processing unit and the accelerator. Compared with the process in the first storage mode, the delay increases by a certain amount. At the same time, storage of data in the memory not only needs to occupy the memory channel but also needs to pass through the PCIe bus, causing a two-way bottleneck between the PCIe and the memory bus and occupying the network interface card bandwidth.

Based on the above introduction to the system storage modes, another embodiment of the present application proposes a new IO path offloading method, which can be embodied as follows: caching input data on a smart network interface card; performing calculation processing by the smart network interface card and caching result data on the smart network interface card; and directly writing service data from the smart network interface card.

Specifically, the network interface card is upgraded to a smart network interface card, so that the smart network interface card can be directly mounted to connect with a memory and the core of the central processing unit. A new storage semantic offloading function is added to the smart network interface card. When data flows from the network through the smart network interface card, the storage semantic are directly extracted for traffic distribution processing. Service data is directly cached in the memory on the smart network interface card, instead of the memory of the central processing unit, while control data and index data are sent to the memory of the central processing unit for further processing. Calculation processing is performed on the smart network interface card, and result data is cached on the smart network interface card. An operator for the calculation can be programmed by FPGA and defined and issued by the central processing unit. The smart network interface card has a programmable hardware circuit FPGA device. The central processing unit and the smart network interface card are connected through a PCIe dedicated interface. Data description and operation description information required for storage acceleration such as EC, CRC, compression and decompression are issued by the SDS software on the central processing unit. The smart network interface card uses FPGA to perform calculation on the data cached in its own memory and access the result. The central processing unit pulls the calculation result and performs next steps which can be arranged. The service data is written directly from the memory of the smart network interface card under the control of the SDS software on the central processing unit without passing through the memory of the central processing unit. Index data and metadata are written from the memory of the central processing unit to the storage medium.

Based on this, in the present application, a data processing method is provided. The present application also involves a data processing apparatus, a computing device, and a computer-readable storage medium, which are described in detail one by one in the following embodiments.

Figure 5:
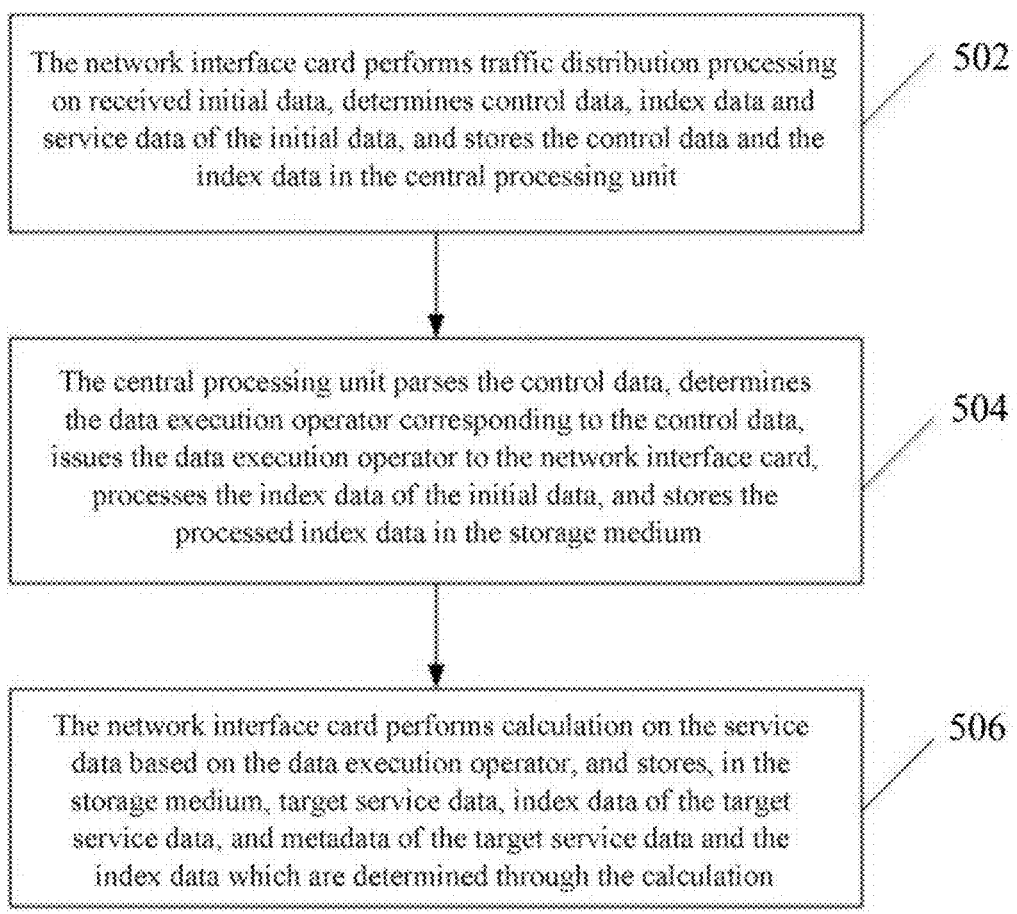
FIG. 5 is a flow chart of a processing process of a data processing method provided by an embodiment of the present application.

See FIG. 5, which shows a flow chart of a processing process of a data processing method provided by an embodiment of the present application, which specifically includes the following steps.

Step 502: the network interface card performs traffic distribution processing on received initial data, determines control data, index data and service data of the initial data, and stores the control data and the index data in the central processing unit.

The initial data can be understood as data obtained from the outside and needs to be stored in the storage medium. Then, before the initial data is stored in the storage medium, the initial data needs to be further processed, and the processed initial data is stored in the storage media.

The control data of the initial data can be understood as the data for how to perform calculation processing on the initial data. The index data can be understood as the index corresponding to the initial data. The service data can be understood as the data in the initial data that actually describes the data content.

Specifically, in order to implement the calculation processing of the control data in the network interface card, the network interface card can perform traffic distribution processing on the received initial data, extract from the received initial data to determine the control data, the index data and the service data corresponding to the initial data, and sends the control data and the index data of the initial data to the central processing unit.

In an actual application, receiving the data by the network interface card can be performed through the network interface, and then traffic distribution processing can be performed on the obtained initial data. Specifically, before the network interface card performs the traffic distribution processing on the received initial data, the following is further included:

the network interface card receives original data through a network interface, and performing network protocol management and control on the original data to determine the initial data.

The network interface may be provided in a network interface unit in the network interface card, such as an RNIC (RDMA Network Interface Card) network interface unit.

In a specific implementation, the original data enters the network interface card from the host and first passes through the RNIC network interface unit. This interface unit handles network-related protocols and controls, such as Ethernet messages such as RoCE v2 (RDMA Over Converged Ethenet v2), TCP (Transmission Control Protocol)/UDP (User Datagram Protocol), etc., so as to determine the initial data in the network interface card, but the processed data flow is still a mixture of service data and storage control data. RoCE is a network protocol that allows the use of RDMA over Ethernet.

The data processing method provided by the embodiment of the present application performs network protocol management and control on the received data through the network interface to achieve unified formatting of the data, thereby facilitating subsequent storage and processing of the initial data.

Further, the network interface card performs traffic distribution processing on the received initial data and uses a data parser to parse and determine the storage semantic rule. Specifically, the network interface card performs traffic distribution processing on the received initial data and determining the control data, the index data and the service data of the initial data includes:

parsing, by a data parser of the network interface card, the received initial data to obtain a storage semantic rule;
determining request boundary information, data boundary information and response boundary information of the initial data based on the storage semantic rules;
determining the control data of the initial data based on the request boundary information and the response boundary information, and determining the index data and the service data of the initial data based on the data boundary information.

The data parser can be understood as a parser with a regular expression engine and that can parse the storage semantic rule.

The storage semantic rule can be understood as the storage semantic rule applicable to the initial data.

The request boundary information, the data boundary information and the response boundary information of the initial data can be understood as identifying the request boundary information, the data boundary information and the response boundary information etc. in the data flow.

In an actual application, the data parser in the network interface card parses the received initial data, to obtain the storage semantic rule, then identifies the request boundary information, the data boundary information and the response boundary information etc. in the data stream, and combines the request boundary information, the response boundary information, etc. as well as the IO context into control data and sends the control data to the central processing unit for further processing, and the index data and the service data of the initial data are determined based on the data boundary information and the response boundary information.

The data processing method provided by the embodiment of the present application realizes the separation of the service data and the control data through the storage protocol parser in the network interface card, reduces invalid transmission of data, and also facilitates subsequent calculation operations of the service data to be allocated to the network interface card for further processing, so as to reduce the processing burden of the central processing unit and accelerate the processing efficiency by offloading the processing process of the central processing unit.

It should be noted that after the control data and the index data are sent to the central processing unit through the above steps, the service data determined by the network interface card is also directly cached in the memory of the network interface card, for the purpose of verifying the service data to determine, in the service data, whether there may be problems such as data damage, data packet loss, etc. Specifically, before the network interface card performs calculation on the service data based on the data execution operator, the following is further included:

caching, by the data parser of the network interface card, the service data, verifying the service data based on the control data, and sending an obtained verification result to the central processing unit.

In an actual application, the data parser in the network interface card can cache the service data directly into the memory of the network interface card in a DMA (Direct Memory Access) mode, and perform CRC check calculation and comparison based on the control data to determine whether the data is intact and reliable and confirm whether the service data is damaged or whether packet dropout occurs to the service data, and then send the data verification result to the central processing unit.

The data processing method provided by the described embodiment checks the service data in advance to determine whether an abnormality has occurred to the service data, and sends the verification result to the central processing unit, so that only when determining that no abnormality has occurred to the service data, the central processing unit can perform subsequent processing on the control data corresponding to the service data, so that further calculation is subsequently performed on the service data and stored in the storage medium to enhance the accuracy of data storage.

Step 504: the central processing unit parses the control data, determines the data execution operator corresponding to the control data, issues the data execution operator to the network interface card, processes the index data of the initial data, and stores the processed index data in the storage medium.

Data execution operator can be understood as the content of specific calculation on the service data, that is, a processing logic for calculating (algorithm) or moving (operation) on data. For example, redundant operation calculation, compression or decompression calculation and other execution operations need to be performed on the service data. Due to programmability, the operator can be overloaded on the same hardware, such as FPGA.

In an actual application, the central processing unit can obtain the control data stored in the memory corresponding to the central processing unit, determine the corresponding data execution operator based on the control data, and issues the determined data execution operator to the network interface card for the purpose of facilitating subsequent specific operations on the service data. At the same time, the central processing unit also processes the index data stored in the memory corresponding to the central processing unit, and stores the processed index data in the storage medium.

Further, the central processing unit parses the control data and determines the data execution operator corresponding to the control data includes:

parsing, by the central processing unit, the control data through a software processing module to determine metadata, index data and configuration information data of the control data;

performing index matching on the metadata, the index data and the configuration information data of the control data, performing index reorganization on the matched metadata, index data and configuration information data of the control data to determine the data execution operator corresponding to the control data.

The software processing module can be understood as the SDS software running on the central processing unit.

In an actual application, the central processing unit obtains the control data through the running SDS software, parses the control data to determine the metadata, the index data and the configuration information data of the control data, and performs index matching on the metadata, the index data and the configuration information data for the purpose of re-matching the to-be-written index information suitable for the distributed nodes. The index operation mainly includes operations such as index aggregation, index search or index segmentation. After the index matching is performed, index reorganization is performed on the matched metadata, index data and configuration information data of the control data, so as to determine the data execution operator corresponding to the control data, that is, a new IO writing description is generated.

The data processing method provided by the embodiment of the present application uses the central processing unit to parse the control data and perform index operations on the metadata, the index data and the configuration information data of the control data, so as to determine the data execution operator corresponding to the control data, so that subsequently the data execution operator is sent to the network interface card for performing calculation on the service data, which reduces the processing operations of the central processing unit and avoids the central processing unit from performing direct CRC stage or copy operations on the service data that would occupy the processing resources of the central processing unit.

In addition, in the data processing method provided by the embodiment of the present application, in addition to parsing the control data, the central processing unit can also process the index data of the initial data, and store the index data and the metadata of the index data in the storage medium. Specifically, the processing the index data of the initial data and storing the processed index data in the storage medium includes:

performing, by the central processing unit, index matching on the index data of the initial data through a software processing module;

performing index reorganization on the matched index data to determine the index data of the initial data and metadata of the index data;

storing the index data of the initial data and the metadata of the index data in the storage medium.

The metadata of the index data can be understood as data describing the status of the index data.

In an actual application, after receiving the control data and the index data of the initial data sent by the network interface card, the central processing unit performs index matching on the index data through the software processing module, performs index reorganization on the matched index data, determines the index data of the initial data and the metadata of the index data, and finally, stores the index data of the initial data and the metadata of the index data in the storage medium.

It should be noted that reference for the specific operation process of index matching and index reorganization can be made to the description of the previous embodiment, and details are not repeated in this embodiment here.

The data processing method provided by the embodiment of the present application processes the index data through the central processing unit, determines the metadata corresponding to the index data, and stores both the index data and the metadata of the index data in the storage medium, ensuring the integrity of data storage and facilitating a quick search for the initial data based on the index data subsequently.

Step 506: the network interface card performs calculation on the service data based on the data execution operator, and stores, in the storage medium, target service data, index data of the target service data, and metadata of the target service data and the index data which are determined through the calculation.

Specifically, after receiving the data execution operator issued by the central processing unit, the network interface card can perform calculation processing on the service data cached in the memory of the network interface card based on the data execution operator, to obtain the calculated service data, the index data of such service data and the metadata of such service data and the index data, and store these three types of data in the storage medium.

In order to facilitate the network interface card to perform calculation on the service data and reduce the processing resources of the central processing unit to perform this calculation step, the network interface card can be configured with an operator overloading device to perform the calculation process. Specifically, the network interface card performs calculation on the service data based on the data execution operator, including:

obtaining, by a computing module of the network interface card, the service data of the initial data, arranging the data execution operator with a hardware apparatus, to obtain a target data execution operator, and performing calculation on the service data based on the target data execution operator.

The computing module of the network interface card can be understood as the operator overloading device (Accelerator). The operator overloading device is a programmable platform with a hardware circuit that can realize flexible switching of operators through local and dynamic reconfiguration technology, store the unloaded operator in the central processing unit and issue the unload operator to the network interface card through an upgrade.

The hardware apparatus can be understood as an FPGA hardware circuit, which assists the operator overloading device in performing operations such as EC and CRC calculations or compression, avoiding the bottleneck of the memory channel bandwidth of the central processing unit and reducing the processing overhead of the central processing unit.

In an actual application, after the operator overloading device in the network interface card obtains the initial service data from the memory of the network interface card, the data execution operator can be arranged through the FPGA hardware circuit to obtain the target data execution operator. For example, operations such as EC and CRC calculation or compression can be performed on the data execution operator. Operator combination can be performed. The arranging operation can be automatically completed. For example, the arranging result is to first perform EC calculation, and then the CRC calculation check information is automatically added to the EC calculation result, so as to determine the target data execution operator. Finally, the operation result together with the service data and the metadata can be sent, through the network interface, to another node storage medium in the distributed nodes.

The data processing method provided by the embodiment of the present application configures the operator overloading device in the network interface card to perform the calculation operation originally performed by the central processing unit, which can not only reduce the processing pressure of the central processing unit, but also make the process of the network interface card processing the service data easier. The bandwidth occupation is thereby reduced and data storage processing efficiency is thus improved.

After processing of the service data calculated by the network interface card, the processed data can also be distributed to a storage medium of other distributed nodes. Therefore, the network interface card also needs to determine a target node to store the data. Specifically, the storing, in the storage medium, the target service data, the index data of the target service data, and the metadata of the target service data and the index data which are determined through the calculation includes:

determining by, a computing module of the network interface card, a target node for data storage based on the data execution operator, and determining a target storage medium according to the target node;

storing, in the target storage medium, the target service data, the index data of the target service data, and the metadata of the target service data and the index data which are determined through the calculation by the computing module.

Specifically, the operator overloading device of the network interface card can determine, based on the received data execution operator, the target node for data storage, and determine the corresponding target storage medium based on the target node. After the operator overloading device performs calculation on the service data, the calculated target service data, the index data of the target service data, and the metadata of the target service data and the index data can be sent through the network interface to the target storage medium for storage.

In an actual application, the network interface card determines whether the target node ID is the present node. If it is the present node, a direct enter into the storage engine can be implemented for the next processing process, and a data writing interface is called to write the data into the storage medium. If the target node receives a request sent by the network interface, the storage engine processing process will also be entered likewise, and then the data writing interface is called to write the data into the storage medium, and thus the IO processing ends.

The data processing method provided by the embodiment of the present application determines the target storage medium and stores the calculated data directly into the target storage medium through the network interface, avoiding the bottleneck of the PCIe bus and bringing about higher performance improvement. After such offloading, the bandwidth of a single CPU node can be quickly improved.

It should be noted that the data processing method provided by the embodiment of the present application further includes:

the network interface, the data parser, the computing module and a storage unit of the network interface card being in communication connection with each other through a preset performance bus;

the network interface card, the central processing unit and the storage medium being in communication connection with each other through a preset application bus.

The preset performance bus can be understood as the AHB bus, and the preset application bus can be understood as the PCIe bus.

In an actual application, the network interface card contains a network interface, an FPGA programmable unit, a data parser, a computing module and a storage unit. The above modules are connected by the AHB bus, and the network interface card is connected to the central processing unit through the PCIe bus. The storage medium provides a persistent storage function and is connected to the central processing unit through the PCIe interface (or first connected to the PCIe bus conversion, and then connected to the central processing unit). The central processing unit can be a single central processing unit or dual central processing units.

The data processing method provided by the embodiment of the present application provides mutual communication connection through the above-mentioned connection channels. Communication connection between respective components achieving by selecting a suitable communication apparatus can accelerate the transmission speed between the respective components and improve the system storage efficiency.

Specifically, a data processing method is provided by another embodiment of the present application, in which an IO flow characteristic of a new storage IO path offloading method is described in detail. See FIG. 6 which shows a schematic structural diagram of an IO flow characteristic of a new storage IO path offloading method in a data processing method provided by an embodiment of the present application.

Figure 6:
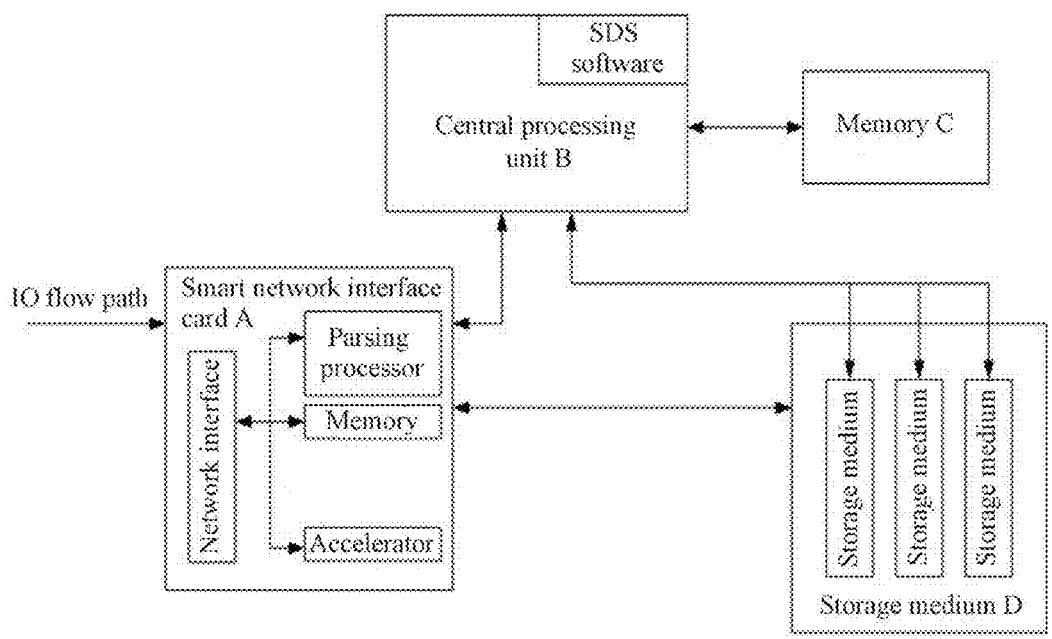
FIG. 6 is a schematic structural diagram of an IO flow characteristic of a new storage IO path offloading method in a data processing method provided by an embodiment of the present application.

In FIG. 6, part A is a smart network interface card. The smart network interface card Includes a parsing processor, a network interface, a memory, and an accelerator. Part B is a central processing unit, part C is a memory, and part D is a storage medium. In an actual application, a data flow enters the smart network interface card from the host through the network interface, and is parsed through the parsing processor to obtain service data, control data and index data. The service data is cached in the memory of the smart network interface card A, and the control data and the index data are sent to the memory C of the central processing unit B. The central processing unit B uses the SDS software to parse and process the control data, to obtain the data execution operator, and issues the data execution operator to the accelerator of the smart network interface card A. At the same time, the central processing unit B obtains the index data from the memory C for processing, to obtain the processed index data and the metadata corresponding to the index data. According to the data execution operator, calculation is performed on the service data in the accelerator of the smart network interface card A, and the calculated service data, the index data of the service data, and the metadata of the index data of the service data are directly stored in the storage medium D from the central processing unit B. The processed index data in the memory C and the metadata corresponding to the index data are also stored in the storage medium D.

Figure 7:
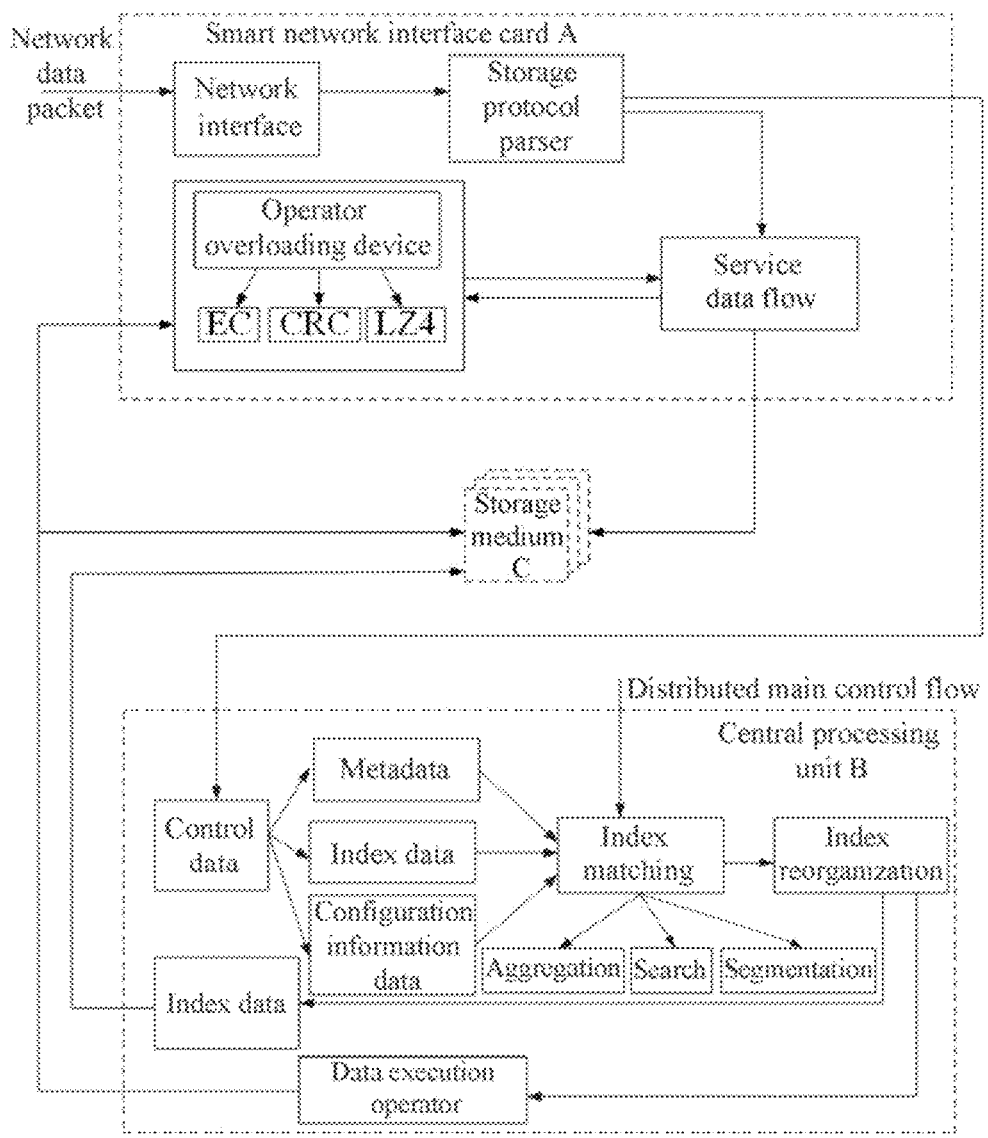
FIG. 7 is a schematic structural diagram of a specific processing process of a data processing method provided by an embodiment of the present application.

Further, see FIG. 7, which shows a schematic structural diagram of a specific processing process of a data processing method provided by an embodiment of the present application.

In FIG. 7, part A is a smart network interface card, part B is a central processing unit, and part C is a storage medium. The smart network interface card A includes a network interface, a storage protocol parser, an operator overloading device, and a service data flow. In an actual application, a network data packet enters the smart network interface card A through a network interface, and extraction processing on the network data packet is performed through a storage protocol parser to obtain control data, service data and index data. The service data flow is cached in the memory of the smart network interface card A, and the control data and the index data are transmitted to the central processing unit B. The central processing unit B performs index matching on the metadata, the index data and the configuration information data in the control data, and performs index reorganization on the matched data. Index matching operations include index aggregation, index search or index segmentation operations. The central processing unit B determines a data execution operator based on the index-reorganized data and issues the data execution operator to the operator overloading device of the smart network interface card A. The operator overloading device processes the service data based on the data execution operator, and stores the processed service data, the index data of the service data, and the metadata of the index data of the service data into the storage medium C. The central processing unit B determines, based on the index-reorganized data, the index data and the metadata corresponding to the index data, and stores the index data and the metadata corresponding to the index data in the storage medium C. LZ4 shown in FIG. 7 is a compression algorithm that can correspond to the compression and decompression calculation introduced in the above embodiment.

In summary, the data processing method provided by the embodiment of the present application defines a new storage IO acceleration method, which realizes a splitting the data calculation operation to the smart network interface card for processing and leaving the control part to the central processing unit for processing, that is, the benefits of parallel acceleration of hardware apparatuses are obtained while the flexibility of the control path is retained. In the smart network interface card, the operator overloading device is utilized to perform the data operation, process the data index and target node ID information, and automatically arranges the execution operator and completes the automatic sending operation for RDMA remote network. The central processing unit can complete the operation in one step without the need to perform multiple operations on the smart network interface card, thereby solving the performance bottleneck problem of the general-purpose server used as a storage node.

Figure 8:
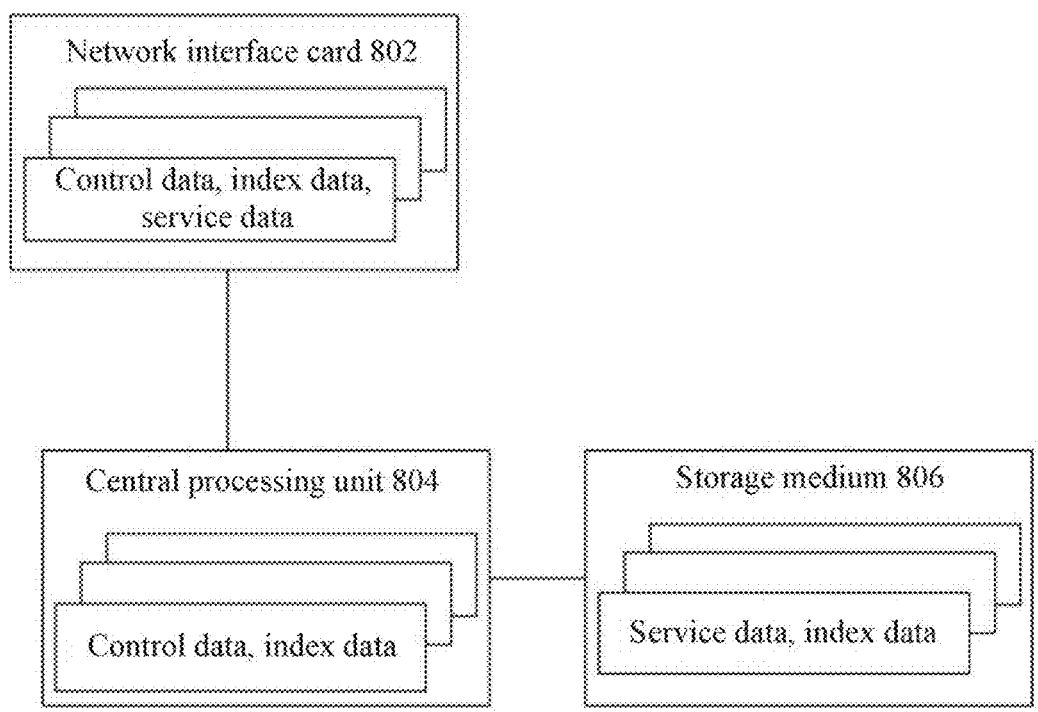
FIG. 8 is a schematic structural diagram of a data processing apparatus provided by an embodiment of the present application.

Corresponding to the above method embodiments, the present application also provides an embodiment of a data processing apparatus. FIG. 8 shows a schematic structural diagram of a data processing apparatus provided by an embodiment of the present application. As shown in FIG. 8, the apparatus includes: a network interface card 802, a central processing unit 804 and a storage medium 806, where the network interface card 802 is configured to perform traffic distribution processing on received initial data, determine control data, index data and service data of the initial data, and store the control data and the index data in the central processing unit;

the central processing unit 804 is configured to parse the control data, determine a data execution operator corresponding to the control data, issue the data execution operator to the network interface card, process the index data of the initial data, and store the processed index data in the storage medium 806;

the network interface card 802 is further configured to perform calculation on the service data based on the data execution operator, and store, in the storage medium 806, target service data, index data of the target service data, and metadata of the target service data and the index data which are determined through the calculation.

In an implementation, the network interface card 802 is further configured to:
parse, by a data parser of the network interface card, the received initial data to obtain a storage semantic rule;
determine request boundary information, data boundary information and response boundary information of the initial data based on the storage semantic rule;
determine the control data of the initial data based on the request boundary information and the response boundary information, and determine the index data and the service data of the initial data based on the data boundary information.

In an implementation, the central processing unit 804 is further configured to:
parse, through a software processing module, the control data to determine metadata, index data and configuration information data of the control data;
perform index matching on the metadata, the index data and the configuration information data of the control data, perform index reorganization on the matched metadata, index data and configuration information data of the control data to determine the data execution operator corresponding to the control data.

In an implementation, the central processing unit 804 is further configured to:
perform index matching on the index data of the initial data through a software processing module;
perform index reorganization on the matched index data to determine the index data of the initial data and metadata of the index data;
store the index data of the initial data and the metadata of the index data in the storage medium.

In an implementation, a computing module of the network interface card is configured to:
obtain the service data of the initial data, arrange the data execution operator with a hardware apparatus, to obtain a target data execution operator, and perform calculation on the service data based on the target data execution operator.

In an implementation, the computing module of the network interface card is further configured to:
determine a target node for data storage based on the data execution operator, and determine a target storage medium according to the target node;
store, in the target storage medium, the target service data, the index data of the target service data, and the metadata of the target service data and the index data which are determined through the calculation by the computing module.

In an implementation, the network interface card 802 is further configured to:
Receive original data through a network interface, and perform network protocol management and control on the original data to determine the initial data.

In an implementation, a data parser of the network interface card is configured to:
cache the service data, verify the service data based on the control data, and send an obtained verification result to the central processing unit.

In an implementation, the apparatus further includes:
the network interface, the data parser, the computing module and a storage unit of the network interface card being in communication connection with each other through a preset performance bus;
the network interface card, the central processing unit and the storage medium being in communication connection with each other through a preset application bus.

In the data processing apparatus provided by the embodiment of the present application, traffic distribution processing is performed on the initial data through the network interface card, and the control data and the index data are stored in the central processing unit. The central processing unit determines the execution operator for the service data of the initial data based on the control data, and issues the execution operator to the network interface card, and then the network interface card performs calculation processing on the service data of the initial data, and stores the processed service data directly from the network interface card to the storage medium. Through the above method, there is no need to occupy the processing resources of the central processing unit, and the computing operation performed by the central processing unit is transferred to the network interface card for execution, which greatly reduces the computing work of the central processing unit to realize the process of data storage acceleration, improve the storage performance of the system, and enhance the user's storage efficiency.

The above is a schematic solution of the data processing apparatus in this embodiment. It should be noted that the technical solution of the data processing apparatus and the technical solution of the above-mentioned data processing method belong to the same concept. For details that are not described in detail in the technical solution of the data processing apparatus, please refer to the description of the technical solution of the above-mentioned data processing method.

Figure 9:
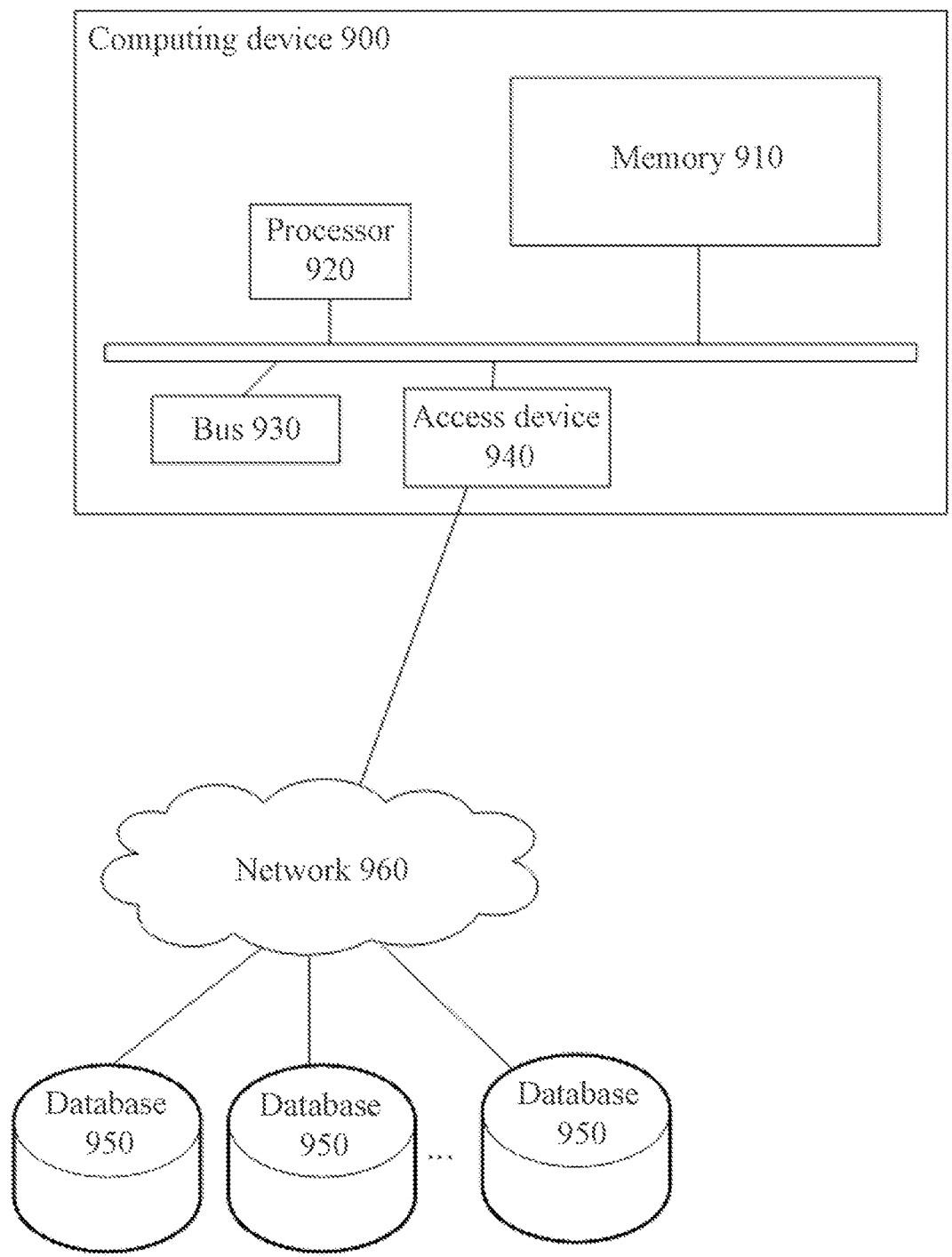
FIG. 9 is a structural block diagram of a computing device provided by an embodiment of the present application.

FIG. 9 shows a structural block diagram of a computing device 900 provided in an embodiment of the present application. Components of the computing device 900 include, but are not limited to, a memory 910 and a processor 920. The processor 920 and the memory 910 are connected through a bus 930, and a database 950 is used to save data.

The computing device 900 further includes an access device 940 that enables the computing device 900 to communicate via one or more networks 960. Examples of these networks include public switched telephone network (PSTN), local area network (LAN), wide area network (WAN), personal area network (PAN), or a combination of communication networks such as the Internet. The access device 940 may include one or more of any type of wired or wireless network interfaces (e.g., Network Interface Card (NIC)), such as an IEEE 802.11 wireless local area network (WLAN) wireless interface, a world interoperability for microwave access (Wi-MAX) interface, an Ethernet interface, a universal serial bus (USB) interface, a cellular network interface, Bluetooth interface, a near field communication (NFC) interface, etc.

In one embodiment of the present application, the above-mentioned components of the computing device 900 and other components not shown in FIG. 9 may also be connected to each other, for example, through a bus. It should be understood that the structural block diagram of the computing device shown in FIG. 9 is for illustrative purposes only and does not limit the scope of the present application. Those skilled in the art can make addition or replacement with other components as needed.

The computing device 900 may be any type of stationary or mobile computing device, including a mobile computer or a mobile computing device (e.g., a tablet computer, a personal digital assistant, a laptop computer, a notebook computer, a netbook, etc.), a mobile telephone (e.g., a smartphone), a wearable computing device (e.g., a smart watch, smart glasses, etc.) or other types of mobile devices, or stationary computing devices such as a desktop computer or a PC (Personal Computer). The computing device 900 may also be a mobile or stationary server.

The processor 920 is configured to execute the following computer-executable instructions. The processor is configured to execute the computer-executable instructions. When the processor executes the computer-executable instructions, the steps of the data processing method are implemented.

The above is a schematic solution of the computing device in this embodiment. It should be noted that the technical solution of the computing device and the technical solution of the above-mentioned data processing method belong to the same concept. For details that are not described in detail in the technical solution of the computing device, please refer to the description of the technical solution of the above data processing method.

An embodiment of the present application also provides a computer-readable storage medium which stores computer-executable instructions. When the computer-executable instructions are executed by a processor, the steps of the data processing method are implemented.

The above is a schematic solution of the computer-readable storage medium in this embodiment. It should be noted that the technical solution of the storage medium and the technical solution of the above-mentioned data processing method belong to the same concept. For details that are not described in detail in the technical solution of the storage medium, please refer to the description of the technical solution of the above data processing method.

An embodiment of the present application further provides a computer program which, when executed in a computer, the computer is caused to perform the steps of the above data processing method.

The above is a schematic solution of the computer program in this embodiment. It should be noted that the technical solution of the computer program and the technical solution of the above-mentioned data processing method belong to the same concept. For details that are not described in detail in the technical solution of the computer program, please refer to the description of the technical solution of the above-mentioned data processing method.

The above has described specific embodiments of the present application. Other embodiments are within the scope of the appended claims. In some cases, the actions or steps recited in the claims can be performed in a different order than in the embodiments and still achieve desired results.

Additionally, the processes depicted in the drawings do not necessarily require the specific order shown, or sequential order, to achieve desirable results. Multitasking and parallel processing are also possible or may be advantageous in certain implementations.

The computer instructions include computer program codes, which may be in the form of source codes, object codes, executable file or some intermediate forms. The computer-readable medium may include: any entity or apparatus capable of carrying the computer program code, a recording medium, a U disk, a mobile hard disk, a magnetic disk, an optical disk, a computer memory, a read-only memory (ROM), a random access memory (RAM), an electrical carrier signal, a telecommunications signal, a software distribution medium, etc. It should be noted that the content contained in the computer-readable medium can be appropriately added or deleted according to the requirements of legislation and patent practice in the jurisdiction. For example, in some jurisdictions, according to legislation and patent practice, the computer-readable medium excludes electrical carrier signals and telecommunications signals.

It should be noted that for the convenience of description, the foregoing method embodiments are expressed as a series of action combinations. However, those skilled in the art should know that the embodiments of the present application are not limited by the described action sequence, because according to the embodiments of the present application, certain steps may be performed in other orders or at the same time. Secondly, those skilled in the art should also know that the embodiments described in the specification are all preferred embodiments, and the actions and modules involved are not necessarily necessary for the embodiments of the present application.

In the above embodiments, each embodiment is described with its own emphasis. For parts that are not described in detail in a certain embodiment, please refer to the relevant descriptions of other embodiments.

The preferred embodiments of the present application disclosed above are only used to help illustrate the present application. Alternative embodiments are not described in all details, nor are the inventions limited to the specific implementations described. Obviously, many modifications and changes can be made according to the contents of the embodiments of the present application. The present application selects and describes these embodiments in detail, so as to better explain the principles and practical applications of the embodiments of the present application, so that those skilled in the art can better understand and utilize the present application. The present application is limited only by the claims and their full scope and equivalents.

The invention claimed is:

1. A data processing method, applied to a server comprising a network interface card, a central processing unit and a storage medium, comprising:
    performing, by the network interface card, traffic distribution processing on received initial data, determining control data, index data and service data of the initial data, and storing the control data and the index data in the central processing unit;
    parsing, by the central processing unit, the control data, determining a data execution operator corresponding to the control data, issuing the data execution operator to the network interface card, processing the index data of the initial data, and storing the processed index data in the storage medium;
    performing, by the network interface card, calculation on the service data based on the data execution operator, and storing, in the storage medium, target service data, index data of the target service data, and metadata of the target service data and the index data which are determined through the calculation.

2. The data processing method according to claim 1, wherein the performing, by the network interface card, the traffic distribution processing on the received initial data and determining the control data, the index data and the service data of the initial data comprises:
    parsing, by a data parser of the network interface card, the received initial data to obtain a storage semantic rule;
    determining request boundary information, data boundary information and response boundary information of the initial data based on the storage semantic rule;
    determining the control data of the initial data based on the request boundary information and the response boundary information, and determining the index data and the service data of the initial data based on the data boundary information.

3. The data processing method according to claim 1, wherein the parsing, by the central processing unit, the control data and determining the data execution operator corresponding to the control data comprises:
    parsing, by the central processing unit, the control data through a software processing module to determine metadata, index data and configuration information data of the control data;
    performing index matching on the metadata, the index data and the configuration information data of the control data, performing index reorganization on the matched metadata, index data and configuration information data of the control data to determine the data execution operator corresponding to the control data.

4. The data processing method according to claim 1, wherein the processing the index data of the initial data and storing the processed index data in the storage medium comprises:
    performing, by the central processing unit, index matching on the index data of the initial data through a software processing module;
    performing index reorganization on the matched index data to determine the index data of the initial data and metadata of the index data;
    storing the index data of the initial data and the metadata of the index data in the storage medium.

5. The data processing method according to claim 1, wherein the performing, by the network interface card, the calculation on the service data based on the data execution operator comprises:
    obtaining, by a computing module of the network interface card, the service data of the initial data, arranging the data execution operator with a hardware apparatus, to obtain a target data execution operator, and performing calculation on the service data based on the target data execution operator.

6. The data processing method according to claim 1, wherein the storing, in the storage medium, the target service data, the index data of the target service data, and the metadata of the target service data and the index data which are determined through the calculation comprises:
    determining, by a computing module of the network interface card, a target node for data storage based on the data execution operator, and determining a target storage medium according to the target node;
    storing, in the target storage medium, the target service data, the index data of the target service data, and the metadata of the target service data and the index data which are determined through the calculation by the computing module.

7. The data processing method according to claim 1, wherein before performing, by the network interface card, the traffic distribution processing on the received initial data, the method further comprises:
receiving, by the network interface card, original data through a network interface, and performing network protocol management and control on the original data to determine the initial data.

8. The data processing method according to claim 2, wherein before performing, by the network interface card, calculation on the service data based on the data execution operator, the method further comprises:
caching, by a data parser of the network interface card, the service data, verifying the service data based on the control data, and sending an obtained verification result to the central processing unit.

9. The data processing method according to claim 1, further comprising:
a network interface, a data parser, a computing module and a storage unit of the network interface card are in communication connection with each other through a preset performance bus;
the network interface card, the central processing unit and the storage medium are in communication connection with each other through a preset application bus.

10. A non-transitory computer-readable storage medium, storing a computer-executable instruction which, when executed by a processor, implements the data processing method according to claim 1.

11. A data processing apparatus, applied to a server comprising a network interface card, a central processing unit and a storage medium,
wherein the network interface card is configured to perform traffic distribution processing on received initial data, determine control data, index data and service data of the initial data, and store the control data and the index data in the central processing unit;
the central processing unit is configured to parse the control data, determine a data execution operator corresponding to the control data, issue the data execution operator to the network interface card, process the index data of the initial data, and store the processed index data in the storage medium;
the network interface card is further configured to perform calculation on the service data based on the data execution operator, and store, in the storage medium, target service data, index data of the target service data, and metadata of the target service data and the index data which are determined through the calculation.

12. The data processing apparatus according to claim 11, wherein the network interface card is further configured to:
parse the received initial data through a data parser of the network interface card to obtain a storage semantic rule;
determine request boundary information, data boundary information and response boundary information of the initial data based on the storage semantic rule;
determine the control data of the initial data based on the request boundary information and the response boundary information, and determine the index data and the service data of the initial data based on the data boundary information.

13. The data processing apparatus according to claim 11, wherein the central processing unit is further configured to:
parse the control data through a software processing module to determine metadata, index data and configuration information data of the control data;
perform index matching on the metadata, the index data and the configuration information data of the control data, perform index reorganization on the matched metadata, index data and configuration information data of the control data to determine the data execution operator corresponding to the control data.

14. The data processing apparatus according to claim 11, wherein the central processing unit is further configured to:
perform index matching on the index data of the initial data through a software processing module;
perform index reorganization on the matched index data to determine the index data of the initial data and metadata of the index data;
store the index data of the initial data and the metadata of the index data in the storage medium.

15. The data processing apparatus according to claim 11, wherein the network interface card is further configured to:
obtain the service data of the initial data, arrange the data execution operator with a hardware apparatus, to obtain a target data execution operator, and perform calculation on the service data based on the target data execution operator.

16. The data processing apparatus according to claim 11, wherein the network interface card is further configured to:
determine a target node for data storage through a computing module of the network interface card based on the data execution operator, and determine a target storage medium according to the target node;
store, in the target storage medium, the target service data, the index data of the target service data, and the metadata of the target service data and the index data which are determined through the calculation by the computing module.

17. The data processing apparatus according to claim 11, wherein before performing the traffic distribution processing on the received initial data, the network interface card is further configured to:
receive original data through a network interface, and perform network protocol management and control on the original data to determine the initial data.

18. The data processing apparatus according to claim 12, wherein before performing calculation on the service data based on the data execution operator the network interface card, the network interface card is further configured to:
cache the service data through a data parser of the network interface card, verify the service data based on the control data, and send an obtained verification result to the central processing unit.

19. The data processing apparatus according to claim 11, further comprising:
a network interface, a data parser, a computing module and a storage unit of the network interface card are in communication connection with each other through a preset performance bus;
the network interface card, the central processing unit and the storage medium are in communication connection with each other through a preset application bus.

20. A data processing system, comprising: a network interface card, a central processing unit and a storage medium,
wherein the network interface card is configured to perform traffic distribution processing on received initial data, determine control data, index data and service data of the initial data, and store the control data and the index data in the central processing unit;

the central processing unit is configured to parse the control data, determine a data execution operator corresponding to the control data, issue the data execution operator to the network interface card, process the index data of the initial data, and store the processed index data in the storage medium;

the network interface card is further configured to perform calculation on the service data based on the data execution operator, and store, in the storage medium, target service data, index data of the target service data, and metadata of the target service data and the index data which are determined through the calculation.

* * * * *